United States Patent
Palai et al.

(10) Patent No.: US 12,397,804 B2
(45) Date of Patent: Aug. 26, 2025

(54) DIAGNOSTICS SYSTEM FOR A VEHICLE

(71) Applicant: JAGUAR LAND ROVER LIMITED, Coventry (GB)

(72) Inventors: Dibyendu Palai, Leamington Spa (GB); Sachin Shinde, Solihull (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 69 days.

(21) Appl. No.: 18/282,732

(22) PCT Filed: Mar. 18, 2022

(86) PCT No.: PCT/EP2022/057179
§ 371 (c)(1),
(2) Date: Sep. 18, 2023

(87) PCT Pub. No.: WO2022/195085
PCT Pub. Date: Sep. 22, 2022

(65) Prior Publication Data
US 2024/0227826 A1 Jul. 11, 2024

(30) Foreign Application Priority Data
Mar. 18, 2021 (GB) .................................... 2103775

(51) Int. Cl.
*B60W 50/02* (2012.01)
(52) U.S. Cl.
CPC ... *B60W 50/0205* (2013.01); *B60W 2050/021* (2013.01); *B60W 2556/25* (2020.02)
(58) Field of Classification Search
CPC ....... B60W 50/0205; B60W 2050/021; B60W 2556/25
(Continued)

(56) References Cited

U.S. PATENT DOCUMENTS

| | | | |
|---|---|---|---|
| 2006/0089767 A1* | 4/2006 | Sowa | G01M 15/05 701/1 |
| 2009/0016216 A1* | 1/2009 | Ballard | G06F 1/266 370/230 |

(Continued)

FOREIGN PATENT DOCUMENTS

| | | |
|---|---|---|
| GB | 2586633 A | 3/2021 |
| WO | 2021037965 A1 | 3/2021 |

OTHER PUBLICATIONS

International Search Report and Written Opinion for Application No. PCT/EP2022/057179, dated Jun. 28, 2022, 14 pages.

(Continued)

*Primary Examiner* — Isaac G Smith
(74) *Attorney, Agent, or Firm* — TROUTMAN PEPPER LOCKE LLP; Dustin B. Weeks; Nicholas H. Doss

(57) ABSTRACT

The present disclosure relates to a diagnostics system (2) for a vehicle (1). The diagnostics system (2) comprises a plurality of application functions (10) for controlling functions of the vehicle, a plurality of I/O interface modules (30) hosting drivers for I/O devices associated with the application functions (10), and a vehicle diagnostics manager or VDM (20). The I/O interface modules (30) are configured to transmit output signals pertaining to operation of their associated I/O devices to the application functions (10) together with a signal tag identifying the I/O interface module that generated the output signal. Each I/O interface module (30) is also configured to run physical fault monitors in order to detect physical faults for its associated I/O devices, and to maintain a fault record of detected physical faults. Each application function (10) is configured to run strategic fault monitors in order to detect strategic faults for its associated vehicle function. The application functions (10) are configured, upon detection of a strategic fault, to identify the signal tag associated with the output signal that (Continued)

caused the detection of the strategic fault, and to report the detected strategic fault to the VDM (20) together with the associated signal tag. The VDM (20) is configured, upon receiving a notification of a detected strategic fault from an application function (10), to identify a source I/O interface module (30) in dependence on the received signal tag, to read physical faults from the identified source I/O interface module (30), and to triage the physical faults from the identified source I/O interface module (30) with the reported strategic fault in order to identify a cause fault for the reported strategic fault.

15 Claims, 3 Drawing Sheets

(58) Field of Classification Search
USPC .......................................................... 701/31.8
See application file for complete search history.

(56) References Cited

U.S. PATENT DOCUMENTS

2009/0295559 A1    12/2009  Howell et al.
2018/0050704 A1*   2/2018   Tascione .............. G07C 5/0808

OTHER PUBLICATIONS

Combined Search and Examination Report for Application No. GB2103775.9 dated Dec. 22, 2021, 10 pages.

* cited by examiner

DIAGNOSTICS SYSTEM FOR A VEHICLE

TECHNICAL FIELD

The present disclosure relates to a diagnostics system for a vehicle and particularly, but not exclusively, to a diagnostics system for an automotive vehicle such as a car. Aspects of the invention relate to a diagnostics system and to a vehicle comprising such a diagnostics system.

BACKGROUND

Modern automotive vehicles such as cars typically include a large number of application functions for controlling different functions of the vehicle. For example, within the body domain of a vehicle, seat application functions may be provided for controlling operation of the vehicle's seats, and door application functions may be provided for controlling operation of the vehicle's doors.

In a traditional electronic architecture, a vehicle's various application functions are hosted on a large number of individual electronic control units (ECUs) that are distributed throughout the vehicle, with each ECU also hosting drivers for the I/O devices associated with its particular application function(s). For example, continuing with the body domain example, a vehicle might include front left, front right, rear left and rear right seat ECUs each hosting seat application functions and I/O drivers for a respective one of the vehicle's seats, and front left, front right, rear left and rear right door ECUs each hosting door application functions and I/O drivers for a respective one of the vehicle's doors.

Using this traditional electrical architecture, identifying, triaging and recording faults at a local level is comparatively simple because the ECUs distributed throughout the vehicle host both the application functions and the drivers for the I/O devices such as sensors and actuators associated with those application functions. The ECUs are therefore able to run diagnostic tests or fault monitors pertaining to both physical or component-level faults (that is faults related to I/O devices and to the vehicle's communication channels) and strategic or system-level faults (that is higher level faults related to the availability, performance or health of the vehicle's application functions). This fault data may then be used to detect physical and strategic faults, which may be triaged in order to classify the detected faults as being either cause faults (that is root cause faults that require a direct repair action) or consequence faults (that is faults that are caused or detected as a consequence of a root cause fault and may not require a direct repair action). However triaging and recording faults at a vehicle-wide level may be more challenging due to the large number of ECUs generating fault data at different locations within the vehicle.

In order to reduce the number of ECUs and the complexity of the wiring harness in vehicles, it may be desirable to move at least some of the vehicle's application functions away from dedicated ECUs, for example onto a central feature hosting system or central compute platform that is able to control various different functions for different sub-systems of the vehicle. The movement of a vehicle's application functions away from dedicated ECUs is known as functional partitioning. In this case the drivers for the I/O devices may still be distributed throughout the vehicle. For example, I/O drivers may be hosted on a plurality of remote input/output concentrator modules or RIOs, each of which may host drivers for and facilitate communication with I/O devices of multiple different sub-systems.

However, moving application functions away from ECUs on which the drivers for the I/O devices associated with those application functions are hosted further complicates the process of triaging and recording faults. In particular, since the application functions are separated from the RIOs on which the I/O drivers are located, neither the application functions nor the RIOs will have access to all of the physical and strategic fault data required for effectively triaging detected faults in order to determine cause and consequence faults.

The present invention has been devised to mitigate or overcome at least some of the above-mentioned problems.

SUMMARY OF THE INVENTION

According to a first aspect of the present invention there is provided a diagnostics system for a vehicle, the diagnostics system comprising a plurality of application functions for controlling functions of the vehicle, a plurality of I/O interface modules hosting drivers for I/O devices associated with the application functions, and a vehicle diagnostics manager (VDM); wherein the I/O interface modules are configured to transmit output signals pertaining to operation of their associated I/O devices to the application functions together with a signal tag identifying the I/O interface module that generated the output signal; wherein each I/O interface module is configured to run physical fault monitors in order to detect physical faults for its associated I/O devices, and to maintain a fault record of detected physical faults; wherein each application function is configured to run strategic fault monitors in order to detect strategic faults for its associated vehicle function; wherein the application functions are configured, upon detection of a strategic fault, to identify the signal tag associated with the output signal that caused the detection of the strategic fault, and to report the detected strategic fault to the VDM together with the associated signal tag; wherein the VDM is configured, upon receiving a notification of a detected strategic fault from an application function, to identify a source I/O interface module in dependence on the received signal tag, to read physical faults from the identified source I/O interface module, and to triage the physical faults from the identified source I/O interface module with the reported strategic fault in order to identify a cause fault for the reported strategic fault.

Since the VDM is configured to receive strategic fault notifications from the application functions and to read physical faults from the I/O interface modules, the diagnostics system of the present invention allows all of the fault data that is required in order to determine cause and consequence faults and maintain a fault record for the entire vehicle to be readily aggregated and triaged. In addition, by only reading physical faults from specific I/O interface modules that have been determined to be related to reported strategic faults, the diagnostics system of the present invention also minimises loading of the vehicle's communication systems and facilitates selection of the correct physical faults for triaging with reported strategic faults.

The VDM may be an on-board diagnostics manager, which may be hosted on a central feature hosting system or central compute platform (CCP) of the vehicle. At least some of the application functions may also be hosted on the CCP.

The VDM may be configured to read physical faults from the I/O interface modules using a diagnostic tester, for example an on-board tester, which may also be hosted on the CCP. The I/O interface modules may be identified and accessed using diagnostic node address information, which may be specified in the signal tags accompanying the output signals transmitted by the I/O interface modules.

The application functions may be configured to transmit notifications of detected strategic faults to the VDM using an event driven interface, for example in response to detection of a strategic fault or in response to a change in DTC status byte.

The VDM may be configured, for each reported strategic fault, to filter the physical faults from the identified source I/O interface module by time and/or by mileage in order to select one or more physical faults for triage with the reported strategic fault. The VDM may, for example, be configured to read time stamp and/or mileage data associated with the reported strategic fault, to determine a time and/or mileage window for the reported strategic fault in dependence on the time stamp and/or mileage data, and to select physical faults from the identified source I/O interface module that correspond to the time and/or mileage window. The VDM may also be configured to filter physical faults from the identified source I/O interface module based on the I/O devices and/or sub-systems to which the physical faults relate.

In some embodiments the VDM may be configured, for each reported strategic fault, to read all physical faults from the identified source I/O interface module, and to filter the received physical faults in order to select one or more physical faults for triage with the reported strategic fault. However, in other embodiments the VDM may be configured to only read physical faults from the identified source I/O interface module that correspond to filter criteria, for example physical faults that correspond to a time and/or mileage window and/or that relate to a particular I/O device or sub-system, in which case loading of the vehicle's communications systems may be further reduced.

The VDM may be configured, for each reported strategic fault, to consult a diagnostics database that specifies possible cause faults that may be responsible for the reported strategic fault, and to identify a physical fault from the identified source I/O interface module as being the cause fault for the reported strategic fault in dependence on the physical fault being specified as a possible cause fault for the reported strategic fault in the diagnostics database. The diagnostics database may, for example, by an ODX (Open Diagnostics data exchange) database. The diagnostics database may be hosted locally on the vehicle, for example on the CCP.

The I/O interface modules may be configured to assess the quality of the data contained in the output signals transmitted to the application functions, and to transmit quality factor information to the application functions together with the output signals. The quality factor information may take the form of a state encoded value and may, for example, indicate high, low or worst quality data. The quality factor information may be included in the signal tag. The signal tag may also include further information identifying the specific I/O device to which the data in the output signal relates.

The application functions may be configured to detect strategic faults in dependence on the received quality factor information.

The VDM may be configured to maintain a central fault record of triaged cause and consequence faults. The central fault record may be maintained in a central fault memory system associated with the VDM. The central fault memory system may comprise a primary fault memory and a user-defined secondary fault memory. The VDM may be configured to store a record of cause faults in the primary fault memory and to store a record of consequence faults in the user-defined secondary fault memory of the central fault memory system.

It will be appreciated that the primary fault memory is a digital storage that is configured to be accessed by any diagnostic client (for example an on-board or off-board tester) that is connected to the vehicle's diagnostics system using a standard diagnostic protocol interface, for example the Unified Diagnostics Services (UDS) protocol interface defined by ISO (the International Organisation for Standardisation). In contrast, the user-defined secondary fault memory is a separate digital storage that is configured to be accessed only by manufacturer approved diagnostic clients, or upon receipt of a specific request which may be defined by the manufacturer of the vehicle.

By storing a record of cause faults in the primary fault memory and a record of consequence faults in the user-defined secondary fault memory of the central fault memory system it may be ensured that a complete record of all detected faults is maintained (and accessible to the vehicle's manufacturer), but that only cause faults are reported when diagnostic data is requested by a diagnostic client using a standard UDS protocol interface.

The I/O interface modules may be configured to maintain their respective fault records in individual user-defined secondary fault memories, which may be hosted locally on the I/O interface modules. The application functions may also be configured to maintain individual fault records of detected strategic faults, either in individually assigned portions of the user-defined secondary fault memory of the central fault memory system, or alternatively in individual user-defined secondary fault memories. Maintaining individual fault records for each I/O interface module and/or for each application function in parallel with the central fault record of cause and consequence faults may assist with retrospective fault analysis.

The I/O interface modules and application functions may be configured to generate confirmed Diagnostic Trouble Codes (DTCs) for the detected physical and strategic faults, and to report the detected physical and strategic faults to the VDM in the form of DTCs. In this case the VDM may not require access to the raw pass/fail outputs of the strategic and physical fault monitors, and need not include fault qualification logic for generating confirmed DTCs.

The I/O interface modules and application functions may be configured, upon detection of a physical or strategic fault, to determine and initiate an appropriate fault reaction, for example disabling the driver for an affected I/O device or disabling an affected vehicle function. In this way it may be possible to initiate appropriate fault reactions upon detection of physical and/or strategic faults without waiting for the fault to be reported to the VDM for triage and recording.

According to a further aspect of the present invention there is provided an automotive vehicle comprising a diagnostics system as described above.

According to a further aspect of the present invention there is provided a method of triaging strategic and physical faults detected for a vehicle, the method comprising: running physical fault monitors in order to detect physical faults for I/O devices of the vehicle; running strategic fault monitors in order to detect strategic faults for functions of the vehicle; upon detection of a strategic fault, identifying a signal tag associated with an output signal that caused the detection of the strategic fault; identifying a source I/O interface module for the detected strategic fault in dependence on the signal tag associated with the strategic fault; reading physical faults from the identified source I/O interface module, and triaging the physical faults from the identified source I/O interface module with the reported strategic fault in order to identify a cause fault for the reported strategic fault.

The method may further comprise, for each reported strategic fault, filtering the physical faults from the identified source I/O interface module by time, by mileage and/or by the I/O the devices or sub-systems to which the physical faults relate in order to select one or more physical faults for triage with the reported strategic fault.

The method may further comprise, for each reported strategic fault, consulting a diagnostics database that specifies possible cause faults that may be responsible for the reported strategic fault, and identifying a physical fault from the identified source I/O interface module as being the cause fault for the reported strategic fault in dependence on the physical fault being specified as a possible cause fault for the reported strategic fault in the diagnostics database.

The method may further comprise updating an on-board fault record to include the triaged cause and consequence faults.

It will be appreciated that the method may also comprise any other steps associated with normal operation of the above-described diagnostics system.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
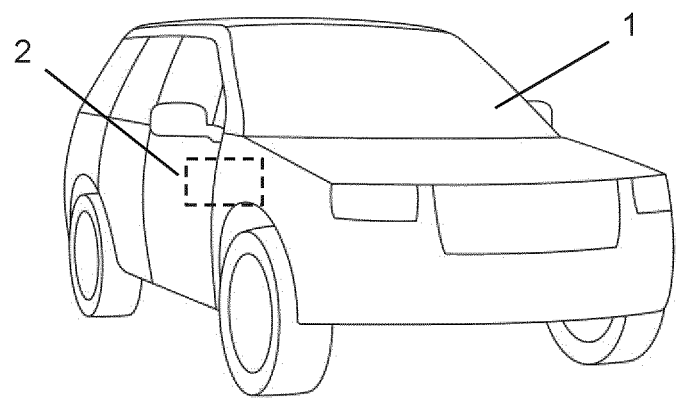
FIG. 1 schematically illustrates a road vehicle comprising a distributed diagnostics system in accordance with one possible embodiment of the present invention.
Figure 2:
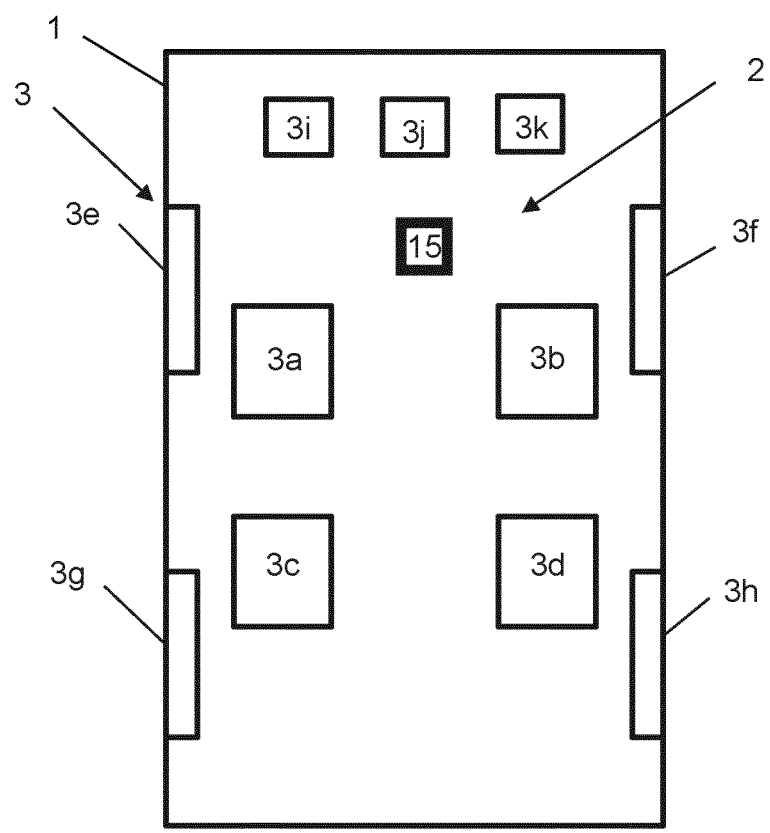
FIG. 2 schematically illustrates a selection of the vehicle's sub-systems.

FIG. 1 schematically illustrates a road vehicle 1 comprising a diagnostics system 2 in accordance with one possible embodiment of the present invention. As is common in modern road vehicles, the vehicle 1 illustrated in FIG. 1 comprises a large number of sub-systems 3 that are configured to implement various different vehicle functions, some of which are illustrated in FIG. 2. The vehicle's sub-systems 3 include, for example, a front left seat 3a, a front right seat 3b, a rear left seat 3c, a rear right seat 3d, a front left door 3e, a front right door 3f, a rear left door 3g, a rear right door 3h, a windscreen wiper system 3i, a lighting system 3j and an alarm system 3k (among many other sub-systems not shown in FIG. 2).

Figure 3:
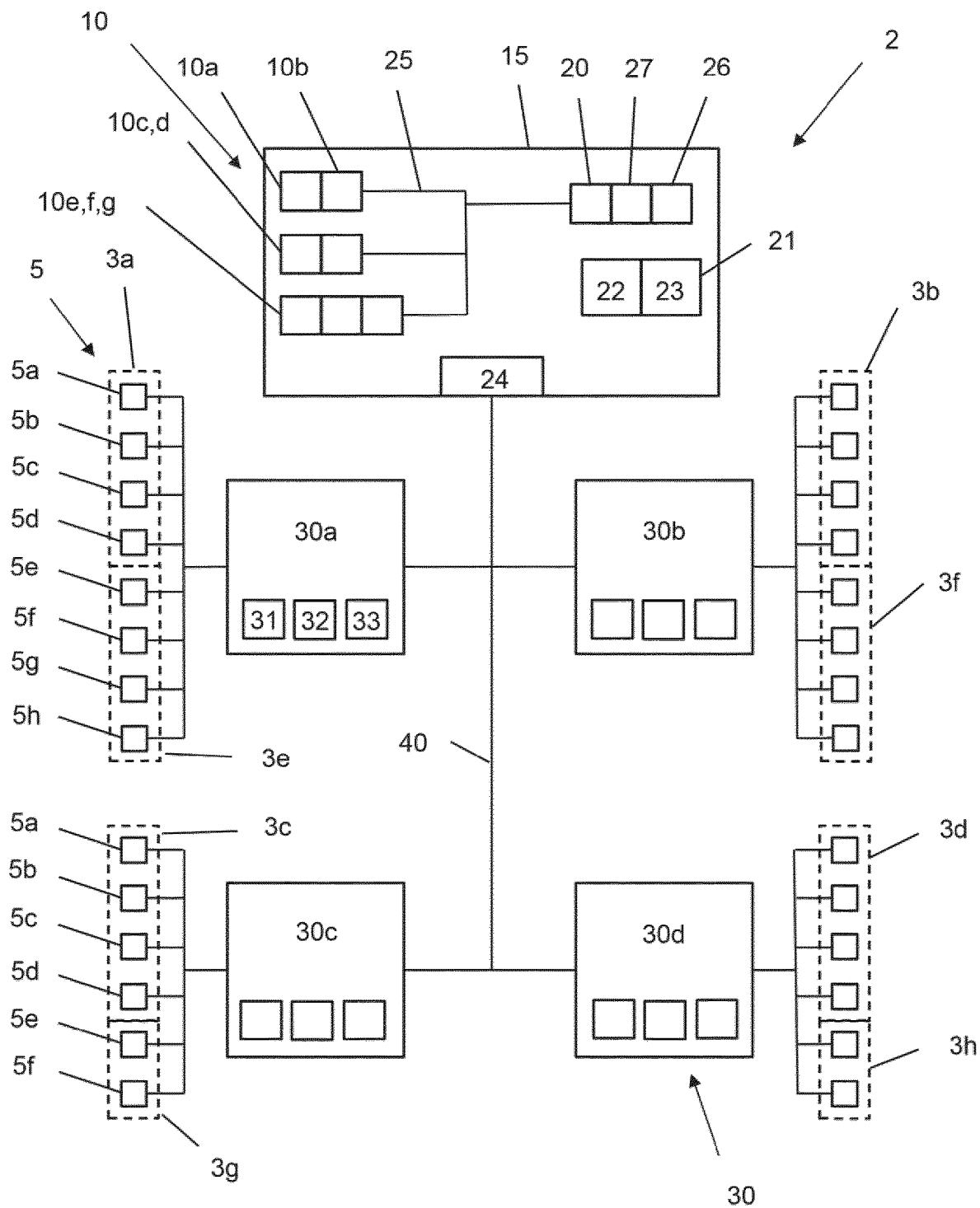
FIG. 3 schematically illustrates a portion of the vehicle's diagnostics system.

Each sub-system 3 includes various I/O devices 5 such as sensors and actuators that are required for implementing vehicle functions, some of which are illustrated in FIG. 3. For example, each seat sub-system 3a, 3b, 3c, 3d includes a height control motor 5a that is configured to adjust seat height, a height position sensor 5b that is configured to monitor seat height, a headrest control motor 5c that is configured to adjust the position of a headrest, and a headrest position sensor 5d that is configured to monitor headrest position (among other sensors and actuators not shown in FIG. 3). In addition, each door sub-system 3e, 3f, 3g, 3h includes a window control motor 5e and a window position sensor 5f, and the front door sub-systems 3e, 3f each include a mirror control motor 5g and a mirror position sensor 5h (among other sensors and actuators not shown in FIG. 3).

The vehicle 1 comprises a number of software applications or application functions 10 that are configured to control operation of the vehicle's various sub-systems 3 in order to implement functions of the vehicle 1, some of which are illustrated in FIG. 3. For example, the vehicle 1 comprises a cluster of seat application functions including a seat control function 10a for controlling the height of each seat using the height control motors, and a seat comfort function 10b for controlling the headrest position of each seat using the headrest control motors. In addition, the vehicle 1 comprises a cluster of door application functions including a window control function 10c for controlling the position of each door window using the window control motors, and a mirror control function 10d for controlling the position of the front left and front right door mirrors using the mirror control motors. The vehicle 1 also comprises a wiper control function 10e for controlling the windscreen wiper system 3i, a lighting control 10f function for controlling the lighting system 3j, and an alarm function 10g for controlling the alarm system 3k (among many other application functions not shown in FIG. 3).

In a conventional electrical architecture, each seat and each door of the vehicle would require one or more local ECUs for controlling vehicle functions such as adjusting seat height and opening and closing windows, with each ECU hosting one or more location-specific application functions and I/O drivers for the sensors and actuators related to the locally hosted application function(s). For example, the front left seat 3a might include a front left seat ECU hosting seat control and seat comfort functions for the front left seat, as well as drivers for the front left seat's sensors and actuators. Similar ECUs would also be required for the remaining seats and for each door.

However, in the electrical architecture illustrated in FIG. 3, the application functions 10 for controlling the vehicle functions related to the seats 3a-d, doors 3e-h, wiper system 3i, lighting system 3j and alarm system 3k have been moved away from local ECUs and onto a central feature hosting system or central compute platform (CCP) 15, thereby eliminating the need for separate ECUs to be provided for each seat and each door of the vehicle 1.

Since the application functions 10 are hosted centrally on the CCP 15, it is possible for each application function 10 to control its particular function for multiple sub-systems located in different zones of the vehicle 1 so that the number of application functions 10 required by the vehicle 1 can be reduced. For example, a single seat control function 10a hosted on the CCP 15 is able to control the height of each seat 3a-d of the vehicle 1, and a single window control function 10*c* hosted on the CCP 15 is able to control the window position for each door 3*e-h* of the vehicle 1.

It will be appreciated that the vehicle 1 will include a large number of other application functions 10 for controlling other vehicle sub-systems 3 in addition to those illustrated in FIG. 3. Some of these additional application functions may also be hosted on the CCP 15. However, other application functions may be hosted at different locations, for example on conventional ECUs and/or on remote input/output concentrator modules or RIOs (which are described in more detail below).

As shown in FIG. 3, the CCP 15 also hosts a vehicle diagnostics manager or VDM 20 which provides various vehicle diagnostics supervisory services to the vehicle 1. In particular, the VDM 20 is configured to create, store and manage a central, vehicle-wide record of detected faults in a central fault memory system 21 including a primary fault memory 22 (from which fault data is available to any diagnostic client that is connected to the vehicle's diagnostics system 2 using a standard UDS protocol interface) and a user-defined secondary fault memory 23 (from which fault data is available only upon receipt of a manufacturer-defined request). The VDM is also configured to report detected faults from the central fault memory system 21 to diagnostic clients such as on-board and off-board testers, as explained in more detail below. The CCP 15 also hosts a common diagnostics server 24 via which the application functions 10 are configured to run diagnostics fault monitors for detecting strategic faults, as explained in more detail below (although in other embodiments one or more of the application functions 10 may instead be provided with its own individual diagnostics server).

As also shown in FIG. 3, the CCP 15 further comprises an on-board tester 26 which is configured to read fault data from various different control modules throughout the vehicle. The CCP 15 also comprises an on-board ODX (Open Diagnostics data exchange) database 27 containing identity and diagnostic address information for the vehicle's various different diagnostic objects including the vehicle's various different control modules and I/O devices 5. The ODX database 27 also includes lists of possible strategic faults for the vehicle's application functions 10 and physical faults for the vehicle's control modules and I/O devices 5, as well as information mapping strategic faults to possible cause faults.

As described above, the application functions 10*a-d* for controlling seat and door related vehicle functions are hosted centrally on the CCP 15 of the vehicle 1. However, the I/O devices that are required for implementing these vehicle functions (that is the sensors and actuators 5*a-h* associated with the vehicle seats 3*a-d* and vehicle doors 3*e-h*) still require local controllers closer to the I/O devices than the CCP 15. For this reason, the vehicle is provided with four I/O interface devices in the form of remote input/output concentrator modules or RIOs 30, one for each major zone of the vehicle, as illustrated in FIG. 3. Each of the four RIOs 30 hosts drivers 31 for and facilitates communication with I/O devices 5 related to multiple different application functions 10 within its respective zone.

In particular, the vehicle 1 comprises a front left RIO 30*a* that hosts drivers for and communicates with the sensors and actuators of the front left seat 3*a* and front left door 3*e*; a front right RIO 30*b* that hosts drivers for and communicates with the sensors and actuators of the front right seat 3*b* and front right door 3*f*; a rear left RIO 30*c* that hosts drivers for and communicates with the sensors and actuators of the rear left seat 3*c* and rear left door 3*g*, and a rear right RIO 30*d* that hosts drivers for and communicates with the sensors and actuators of the rear right seat 3*d* and rear right door 3*h*. Drivers for the I/O devices of the wiper system 3*i*, lighting system 3*j* and alarm system 3*k* may also be hosted on one or more of above described RIOs 30.

It will be appreciated that the vehicle 1 may also include various other RIOs 30 and/or sub-system specific ECUs in addition to the four RIOs 30 illustrated in FIG. 3 hosting drivers for and facilitating communication with other I/O devices not illustrated in FIG. 3.

The RIOs 30 are connected to and configured to communicate with their respective I/O devices 5 via local links, for example CAN or LIN links. The RIOs 30 are further connected to and configured to communicate with the application functions 10 hosted on the CCP 15 via a backbone link or wiring harness 40, for example an Ethernet or FlexRay link.

In particular, the RIOs 30 are configured to receive network signals from the application functions 10 containing instructions for controlling operation of their respective I/O devices 5 via the backbone link 40, and to control operation of their respective I/O devices 5 in accordance with the received instructions. In addition, the RIOs 30 are configured to receive output data from their respective I/O devices 5 via the local links, including sensor output from their associated sensors and motor circuit current data from their associated actuators, and to transmit output signals containing output data from their respective I/O devices 5 to the application functions 10 via the backbone link 40.

As shown in FIG. 3, each RIO 30, in addition to I/O and COM drivers 31 for its respective I/O devices 5, further comprises a diagnostics server 32 and a user-defined secondary fault memory 33.

Each of the diagnostics servers 32 is configured to run diagnostic tests or fault monitors pertaining to physical faults for the I/O devices 5 and communication channels associated with its respective RIO 30. In particular, the diagnostics servers 32 include device driver-level fault detection debounce logic that is configured to generate pass/fail data for specific physical faults. Physical pass/fail data may, for example, be generated by comparing output data from the I/O devices 5 to configurable, device-specific threshold levels.

The diagnostics servers 32 are also provided with fault detection and DTC qualification logic for detecting physical faults and generating confirmed DTCs in dependence on the pass/fail outcomes of the physical fault monitors. The diagnostics servers 32 may, for example, be configured to detect a physical fault and generate a confirmed physical DTC if the output of an I/O device 5 exceeds or falls below a device-specific threshold level over a predetermined time period or number of monitoring cycles.

Upon detection of a physical fault, the RIOs 30 are configured to determine and initiate an appropriate fault reaction, for example disabling the relevant driver 31 until the detected fault has been repaired. For some physical faults, a warning notification regarding the detection of the physical fault may be generated and communicated to a user of the vehicle for example via an in-vehicle display screen or instrument panel cluster. The RIOs 30 are also configured to maintain local fault records of detected physical faults in their individual user-defined secondary fault memories 33. However, the RIOs 30 are not required to transmit notifications of a detected physical fault to any other portion of the vehicle 1 upon detection of the physical fault.

The local physical fault records maintained by the RIOs 30 include the DTC and status byte for each detected physical fault. The physical fault records also include snapshot data for each detected physical fault, which is captured by the RIOs 30 upon detection of a fault. The snapshot data includes the identity of the detecting RIO 30, for example the diagnostic node address of the detecting RIO 30. The snapshot data also includes time stamp and mileage data indicating the time and mileage at which each physical fault was detected. The snapshot data may also include the identity of the I/O device 5 to which the detected physical fault relates. In the case of faults caused by smart sensors, the sensor responsible for the detected fault may be identified by its LIN network address. For faults caused by other devices the responsible device may be identified by its serial number or part number. The physical fault records may also include a dynamic extended data record for each detected physical fault.

As mentioned above, the RIOs 30 are configured to transmit output signals containing output data from their respective I/O devices 5 to the application functions via the backbone link 40. The output data from the I/O devices 5 is processed using device-level stability debounce logic to obtain a stable output before being transmitted to the application functions 10. The output signals transmitted from the RIOs 30 to the application functions 10 are each accompanied by a signal tag. The signal tags may be transmitted together with the output data as part of the same output signal, or alternatively as a separate signal associated with the output signal containing the output data.

The signal tags include information identifying the broadcasting RIO 30, for example the diagnostic node address of the RIO 30 that published the output signal to which the signal tag relates. The signal tags also include information identifying the specific I/O device 5, for example the specific sensor or actuator, to which the output data contained in the output signal relates. The signal tags also include quality factor information in the form of a state encoded value indicating the quality of the output data contained in the output signal as determined by the diagnostics servers 32 of the RIOs 30. The quality factor information may be generated by the above-described fault detection debounce logic, or alternatively using separate signal quality assessment logic. The quality factor information may, for example, indicate high, low or worst quality data. In some cases the quality factor information may also indicate the reason for the quality assessment.

The application functions 10 are configured to receive the output signals transmitted by the RIOs 30 together with their accompanying signal tags. The output data contained in the output signals may then be used by the application functions 10 for the purposes of controlling and monitoring their respective vehicle functions.

In addition, the application functions 10 are also configured to use the common diagnostics server 24 hosted on the CCP 15 (or alternatively individual diagnostics servers associated with the respective application functions 10) to run diagnostic tests or fault monitors pertaining to strategic faults, that is higher level faults related to the availability, performance or health of vehicle functions. The strategic fault monitors run by the application functions 10 may, for example, be configured to detect a strategic fault if low or worst quality data is reported for an application-critical I/O device 5 over a predetermined time period or number of monitoring cycles, or if output data from an application-critical I/O device 5 is unavailable. The diagnostics server 24 of the CCP 15 (or individual diagnostics servers of the application functions 10) are also provided with DTC qualification logic for generating confirmed DTCs for detected strategic faults.

Upon detection of a strategic fault for a vehicle function, the application functions 10 are configured to determine and initiate an appropriate fault reaction, for example disabling the relevant vehicle function until the detected fault has been repaired. For some strategic faults, a warning notification regarding detection of the strategic fault may be generated and communicated to a user of the vehicle for example via the in-vehicle display screen or instrument panel cluster. The application functions 10 are also configured to maintain individual fault records of detected strategic faults in individually assigned portions of the user-defined secondary fault memory portion 23 of the central fault memory system 21 (or alternatively in individual user-defined secondary fault memories associated with the respective application functions 10).

The strategic fault records maintained by the application functions 10 include the DTC and status byte for each detected strategic fault. The strategic fault records also include snapshot data for each detected strategic fault, which is captured by the application functions 10 upon detection of a fault. The snapshot data includes the identity of the detecting application function 10, for example the diagnostic node address of the detecting application function 10. The snapshot data also includes time stamp and mileage data indicating the time and mileage at which each strategic fault was detected. The strategic fault records may also include a dynamic extended data record for each detected strategic fault.

Upon detection of a strategic fault, the application functions 10 are also configured to identify the signal tag associated with the output signal that is responsible for the detection of the strategic fault, and to associate the signal tag with the detected strategic fault in their strategic fault records. The application functions 10 are further configured to report detected strategic faults to the VDM 20 via the service bus 25 of the CCP 15, including the DTC, status byte and associated snapshot data, together with the associated signal tag. Strategic faults are preferably reported to the VDM 20 using an event driven interface, for example in response to a change in DTC status byte confirming a strategic DTC.

Upon receipt of a notification of a detected strategic fault from one of the application functions 10, the VDM 20 is configured to initiate on-board fault decomposition and to triage strategic and physical faults in order to identify related cause faults (that is root cause faults that require a direct repair action) and consequence faults (that is faults that are caused or detected as a consequence of a root cause fault and may not require a direct repair action).

In particular, the VDM 20 is configured to identify the source RIO 30 that transmitted the output signal that is responsible for detection of the reported strategic fault based on the diagnostic node address specified in the received signal tag. The VDM 20 is then able to read physical fault data including confirmed DTCs and associated snapshot data from the user-defined secondary fault memory 33 of the identified source RIO 30 via the on-board tester 26 using UDS service 0x19. In the present example the VDM 20 is configured to read all of the physical faults stored in the user-defined secondary fault memory 33 of the identified source RIO 30.

The VDM 20 is further configured to read the time stamp from the snapshot data associated with the reported strategic fault, and to use the time stamp to determine a time window within which it is expected that the cause fault for the reported strategic fault occurred. The time window may, for example, be a 5 second window extending up to the time stamp of the reported strategic fault or a 10 second window extending for 5 seconds on either side of the time stamp of the reported strategic fault, although other durations are also possible. The VDM 20 is then able to filter the physical faults read from the identified source RIO 30 by time using the time stamps from the snapshot data associated with each physical fault in order to obtain a filtered list of physical faults that correspond to the time window generated for the reported strategic fault. The VDM 20 may alternatively, or additionally, be configured to determine a mileage window for the reported strategic fault based on the mileage identified in the snapshot data associated with the reported strategic fault, and to filter the physical faults read from the identified source RIO 30 by mileage. The mileage window may, for example, be a 5 mile window extending up to the mileage at which the reported strategic fault was detected or a 10 mile window extending for 5 miles on either side of the mileage at which the reported strategic fault was detected. The VDM 20 may also in some embodiments be configured to filter physical faults based on the specific I/O devices 5 or sub-systems 3 to which they relate, for example based on an I/O device or subsystem identified in the signal tag associated with the reported strategic fault.

In the above-described example the VDM 20 is configured to read all of the physical faults stored in the user-defined secondary fault memory 33 of the identified source RIO 30, and to subsequently filter the received physical faults. However, it is also possible for the VDM 20, when reading physical faults from the identified source RIO 30, to first establish filter criteria, for example a time window, and to only read physical faults that correspond to filter criteria.

In addition to obtaining a filtered list of potentially relevant physical faults from the identified source RIO 30, the VDM 20 is also configured to consult the ODX database 27 in order to determine whether or not any of the potentially relevant physical faults from the identified source RIO 30 are possible cause faults for the reported strategic fault. The VDM 20 may, for example, be configured to obtain a list of physical DTCs that are identified in the ODX database 27 as being possible cause faults for the reported strategic fault, and to compare the filtered list of physical faults to the list of possible cause DTCs in order to look for a match.

If one of the physical faults from the filtered list is specified as being a possible cause fault for the reported strategic fault, then the VDM 20 is configured to identify that physical fault as being the cause fault for the reported strategic fault. The VDM 20 then records the physical cause fault (including the DTC, status byte and associated snapshot data) in a cause fault record in the primary fault memory portion 22 of the central fault memory system 21, and records the strategic consequence fault (including the DTC, status byte and associated snapshot data) in a consequence fault record in the user-defined secondary fault memory portion 23 of the central fault memory system 21. The physical cause fault is also linked to the strategic consequence fault in the central fault memory system 21 in order to establish a cause-consequence chain, for example by recording the strategic consequence DTC in an extended context record for the physical cause fault in the cause fault record.

If on the other hand, none of the physical faults from the filtered list is specified as being a possible cause fault for the reported strategic fault then the VDM 20 is not able to establish a cause-consequence chain for the reported strategic fault. In this case the physical faults read from the identified source RIO 30 are still recorded as cause faults in the cause fault record, and the reported strategic fault is still recorded in the consequence fault record. However, the physical faults recorded in the cause fault record are not linked to the reported strategic fault since no causal link could be established.

In this way the VDM 20 is configured to perform a two stage triaging process, in which physical faults from the relevant RIO 30 are first read and filtered, and then compared to a list of possible cause faults in order to identify the physical cause fault for a particular strategic consequence fault.

Once one or more DTCs have been recorded in the central fault memory system 21, the VDM 20 is then able to make the recorded DTCs available to diagnostic clients such as on-board and off-board testers. For example, if a diagnostic client such as a third-party off-board tester is connected to the diagnostics system 2 of the vehicle 1 either wirelessly or physically via an on-board diagnostic connector such as a J1962 connector using a standard UDS protocol interface then the VDM 20 will report all cause DTCs from the primary fault memory portion 22 of the central fault memory system 21 to the diagnostic client, with the related consequence DTCs being available via extended context records. However, the consequence DTCs will not be reported directly unless a manufacturer-defined request is received by the VDM 20.

In order to further aid understanding of the present invention, a specific example of the process for detecting, triaging and recording related strategic and physical faults will now be described with reference to the height control motor 5a of the front left seat 3a and the seat control function 10a. However, it will be appreciated that the following description relates to only one of many possible sets of physical and strategic faults that may be detected and recorded by the above-described vehicle diagnostics system 2, and that other faults related to other I/O devices 5, sub-systems 3 and application functions 10 may be detected and recorded in an equivalent manner.

The RIOs 30 are each configured to receive output signals from the seat control function 10a containing instructions for controlling operation of their respective seat height control motors 5a, and to control operation of their respective seat height control motors 5a in accordance with the received instructions. The RIOs 30 are also configured to receive motor circuit current data from their respective seat height control motors 5a, and to operate their respective diagnostics servers 32 to run diagnostic fault monitors pertaining to their respective seat height control motors 5a.

In particular, the diagnostic servers 32 of the RIOs 30 are configured to compare the motor circuit current for their respective height control motors 5a to a low threshold level in order to check for an open circuit failure condition, and to a high threshold level in order to check for a short circuit failure condition. As long as the motor circuit current for each height control motor 5a remains between the low and high threshold values then both the open circuit fault monitor and the short circuit fault monitor will generate pass data for each height control motor 5a.

However, if, for example, the height control motor 5a of the front left seat 3a suffers an open circuit fault causing the motor circuit current to fall below the low threshold, then the front left seat height control motor open circuit fault monitor will generate fail data. If fail data is generated continuously over a predefined time period or number of monitoring cycles then the diagnostics server 32 of the front left RIO 30a will detect an open circuit fault for the height control motor 5a of the front left seat 3a and generate a confirmed DTC for the front right seat height control motor open circuit fault. The detected physical fault will then be recorded in the user-defined secondary fault memory 33 of the front left RIO 30a, including the DTC, status byte, snapshot data (with a time stamp and mileage reading for the detected physical fault) and an extended data record. The front left RIO 30a will also disable the I/O driver 31 of the height control motor 5a of the front left seat 3a until the fault has been repaired in order to protect the height control motor 5a and driver 31.

Similarly, in the case of a short circuit fault causing the motor circuit current of the height control motor 5a of the front left seat 3a to exceed the high threshold over a predefined time period or number of monitoring cycles then the front left RIO 30a will detect a short circuit fault, generate a confirmed DTC for the front right seat height control motor open circuit fault, record the detected physical fault in its user-defined secondary fault memory 33, and disable the relevant I/O driver 31.

In addition, the RIOs 30 periodically transmit output signals containing debounced motor circuit current data from their respective height control motors 5a to the seat control function 10a hosted on the CCP 15 (as well as output signals containing debounced sensor output from their respective height position sensors 5b). The output signals are transmitted together with output signal tags, which specify the diagnostic node address of the broadcasting RIO 30, the I/O device 5a to which the output signal relates, and the quality of the output data contained in the output signal as determined by the broadcasting RIO 30.

As long as the seat control function 10a continues to receive valid output data for each of the height control motors 5a (as well as the height position sensors 5b and any other devices on which the seat control function 10a relies), the strategic fault monitors of the seat control function 10a generate pass data for the seat height adjustment function for each vehicle seat 3a, 3b, 3c, 3d. However, if, for example, the signal tags accompanying the output signals received from the front left RIO 30a indicate that the output data from the height control motor 5a of the front left seat 3a is of low or worst quality over a predefined time period or number of monitoring cycles, for example due to the above-described open circuit fault, then the seat control function 10a detects a strategic fault for seat height adjustment for the front left seat 3a and disables this vehicle function. The seat control function 10a may also generate a warning notification that seat height adjustment has been disabled for the front left seat 3a, which may be displayed to a user of the vehicle 1 via the in-vehicle display screen or instrument panel cluster.

The seat control function 10a also generates a corresponding strategic DTC indicating unavailability of seat height adjustment for the front left seat 3a, and stores a record of the detected strategic fault in its own individually assigned portion of the user-defined secondary fault memory 23 of the central fault memory system 21 (or alternatively in an individual user-defined secondary fault memory associated with the seat control function 10a), including the DTC, status byte, snapshot data (with a time stamp and mileage reading for the detected strategic fault) and an extended data record. The signal tag associated with the output signal that is responsible for the detection of the strategic fault is also identified and associated with the detected strategic fault in the seat control function's strategic fault record.

Upon confirmation of the strategic DTC indicating unavailability of seat height adjustment for the front left seat 3a, for example in response to a change in DTC status byte, the seat control function 10a reports the detected strategic fault to the VDM 20, including the DTC, status byte and associated snapshot data, together with the associated signal tag. The VDM 20 then reads the signal tag associated with the reported strategic fault in order to determine the diagnostic node address of the RIO 30 that is responsible for broadcasting the output signal that lead to detection of the reported strategic fault, which in the present case is the front left RIO 30a. The VDM 20 is then able to read physical fault data from the user-defined secondary fault memory 33 of the front right RIO 30a, including confirmed DTCs and associated snapshot data, via the on-board tester 26 using UDS service 0x19.

The VDM 20 also uses the time stamp from the snapshot data associated with the reported strategic fault to determine a time window for the cause fault, and filters the physical faults from the user-defined secondary fault memory 33 of the front right RIO 30a in order to obtain a filtered list of physical faults that correspond to the time window for the reported strategic fault. The filtered list will include the above described open circuit fault for the height control motor 5a of the front left seat 3a together with any other physical faults that have been detected by the front left RIO 30a during the specified time window.

The VDM 20 also consults the ODX database 27 in order to obtain a list of possible cause faults that may be responsible for unavailability of seat height adjustment for the front left seat 3a. This list will include open circuit and short circuit faults for the height control motor 5a and the height position sensor 5b of the front left seat 3a, among other possible cause faults. The filtered list of physical faults from the front left RIO 30a is then compared to the list of possible cause faults, from which it may be determined that the open circuit fault for the height control motor 5a of the front left seat 3a is the cause fault for the reported unavailability of seat height adjustment for the front left seat 3a.

The DTC for the height control motor failure is then recorded as a cause fault in the cause fault record in the primary fault memory portion 22 of the central fault memory system 21 together with its associated snapshot data and an extended context record linking the height control motor failure to the DTC for unavailability of seat height adjustment function. The DTC for unavailability of seat height adjustment function is similarly recorded as a consequence fault in the consequence fault record in the user-defined secondary fault memory portion 23 of the central fault memory system 21 together with its associated snapshot data.

The above-described example is a very simple example including only a single physical cause fault and a single strategic consequence fault. However, it will be appreciated that in more complex cases a single physical cause fault may result in the detection of multiple strategic consequence faults by different application functions. In this case the common physical cause fault may be linked to multiple different strategic consequence faults in the on-board fault record, for example by recording multiple strategic consequence DTCs in the extended context record for the physical cause fault.

In addition, in the above-described example, the strategic fault is detected by an application function as a direct consequence of a physical fault detected by one of the RIOs. In this case, the diagnostic node address specified in the signal tag associated with the strategic fault directly identifies the source RIO that detected the relevant physical cause fault, from which physical faults may be read and filtered in order to identify the relevant physical cause fault for the strategic fault in the manner described above.

However, in other cases, a strategic fault may also be detected indirectly based on the detection of another strategic fault. In this case the diagnostic node address specified in the signal tag associated with the indirectly-caused strategic fault may identify the application function that detected the other strategic fault instead of directly identifying the RIO that detected the physical cause fault that is ultimately responsible for the detection of both strategic faults. In such cases, the diagnostic node address specified in the signal tag associated with the indirectly-caused strategic fault may be used to read strategic faults from the other application function, which may then be filtered in order to identify the intermediate strategic fault based on which the indirectly-caused strategic fault was detected.

If the intermediate strategic fault was detected as a direct consequence of a physical fault then the diagnostic node address specified in the signal tag associated with the intermediate strategic fault will identify the source RIO that detected the physical cause fault that is ultimately responsible for the detection of both strategic faults, from which physical faults may be read and filtered in order to identify the relevant physical cause fault that is ultimately responsible for the detection of both strategic faults. If, on the other hand, the intermediate strategic fault was detected based on the detection of another strategic fault then the same process may be repeated until the ultimately responsible physical cause fault is located. In this way it is possible to establish a cause-consequence chain for indirectly-caused strategic faults as well as strategic faults that are detected as a direct consequence of a physical fault.

Figure 4:
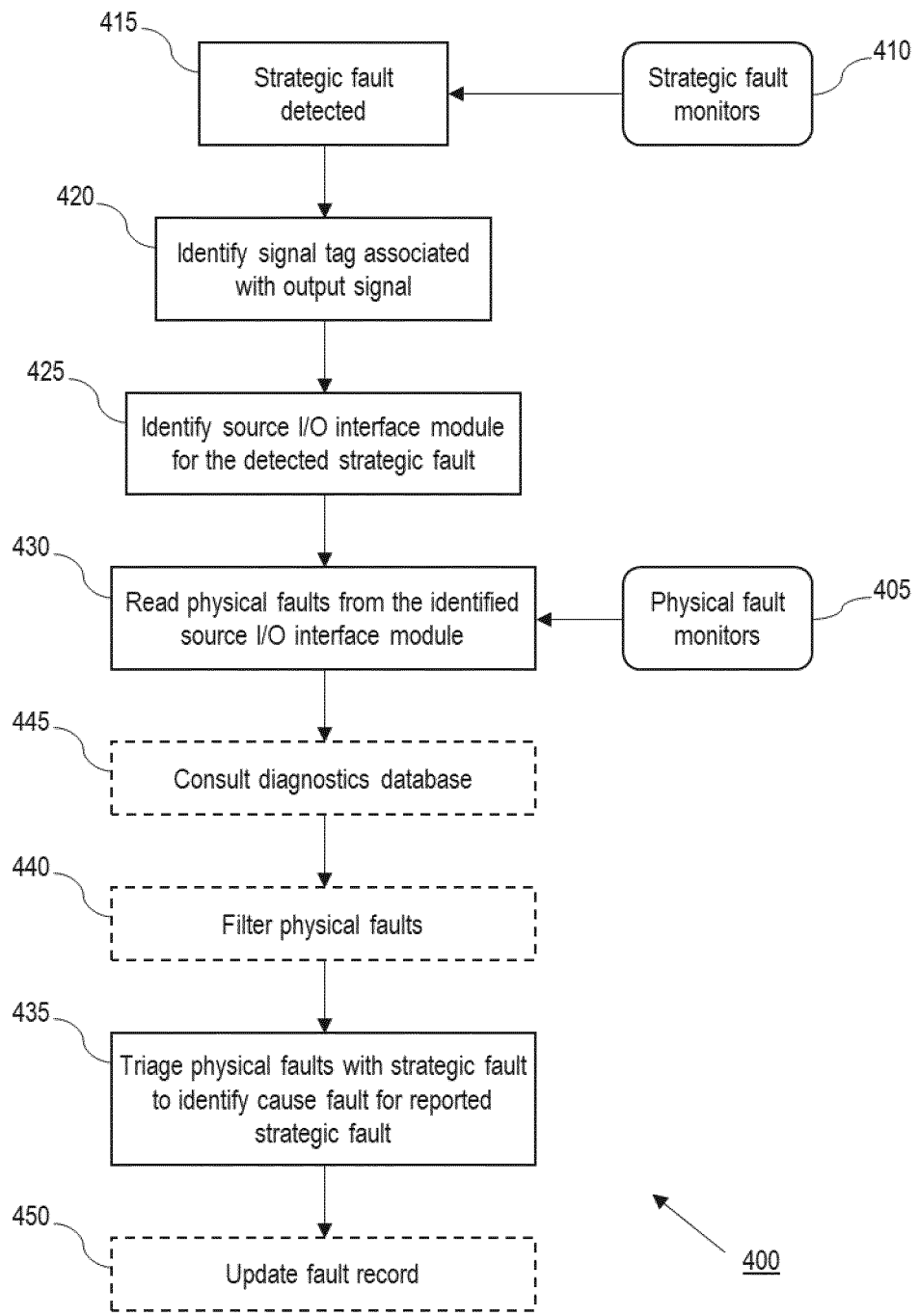
FIG. 4 illustrates a simplified flowchart of an example of a method of triaging strategic and physical faults detected for a vehicle according to some embodiments of the present invention.

Referring now to FIG. 4, there is illustrated a simplified flowchart 400 of an example of a method of triaging strategic and physical faults detected for a vehicle according to some embodiments of the present invention. The method comprises: running physical fault monitors at 405 in order to detect physical faults for I/O devices of the vehicle; running strategic fault monitors at 410 in order to detect strategic faults for functions of the vehicle; upon detection of a strategic fault at 415, identifying a signal tag associated with an output signal that caused the detection of the strategic fault at 420; identifying a source I/O interface module for the detected strategic fault in dependence on the signal tag associated with the strategic fault at 425; reading physical faults from the identified source I/O interface module at 430 and triaging the physical faults from the identified source I/O interface module with the reported strategic fault in order to identify a cause fault for the reported strategic fault at 435.

The method may further comprise, for each reported strategic fault, filtering the physical faults from the identified source I/O interface module by time, by mileage and/or by the I/O the devices or sub-systems to which the physical faults relate in order to select one or more physical faults for triage with the reported strategic fault at 440.

The method may further comprise, for each reported strategic fault, consulting a diagnostics database at 445 that specifies possible cause faults that may be responsible for the reported strategic fault, and identifying a physical fault from the identified source I/O interface module as being the cause fault for the reported strategic fault in dependence on the physical fault being specified as a possible cause fault for the reported strategic fault in the diagnostics database.

The method may further comprise updating an on-board fault record to include the triaged cause and consequence faults at 450.

It will be appreciated that the method may also comprise any other steps associated with normal operation of the above-described diagnostics system.

It will be appreciated that many modifications may be made to the above-described vehicle diagnostics system without departing from the scope of the present invention as defined in the accompanying claims.

The invention claimed is:

1. A diagnostics system for a vehicle, the diagnostics system comprising a plurality of application functions for controlling functions of the vehicle, a plurality of I/O interface modules hosting drivers for I/O devices associated with the application functions, and a vehicle diagnostics manager, VDM;
    wherein the I/O interface modules are configured to transmit output signals pertaining to operation of their associated I/O devices to the application functions together with a signal tag identifying the I/O interface module that generated the output signal;
    wherein each I/O interface module is configured to run physical fault monitors in order to detect physical faults for its associated I/O devices, and to maintain a fault record of detected physical faults;
    wherein each application function is configured to run strategic fault monitors in order to detect strategic faults for its associated vehicle function;
    wherein the application functions are configured, upon detection of a strategic fault, to identify the signal tag associated with the output signal that caused the detection of the strategic fault, and to report the detected strategic fault to the VDM together with the associated signal tag;
    wherein the VDM is configured, upon receiving a notification of a detected strategic fault from an application function, to identify a source I/O interface module in dependence on the received signal tag, to read physical faults from the identified source I/O interface module, and to triage the physical faults from the identified source I/O interface module with the reported strategic fault in order to identify a cause fault for the reported strategic fault.

2. The diagnostics system according to claim 1, wherein at least one of the application functions is hosted on a central compute platform of the vehicle.

3. The diagnostics system according to claim 1, wherein the VDM is configured, for each reported strategic fault, to filter the physical faults from the identified source I/O interface module by time, by mileage and/or by the I/O the devices or sub-systems to which the physical faults relate in order to select one or more physical faults for triage with the reported strategic fault.

4. The diagnostics system according to claim 3, wherein the VDM is configured, for each reported strategic fault, to read all physical faults from the identified source I/O interface module, and to filter the received physical faults in order to select one or more physical faults for triage with the reported strategic fault.

5. The diagnostics system according to claim 3, wherein the VDM is configured, for each reported strategic fault, to only read physical faults from the identified source I/O interface module that correspond to filter criteria.

6. The diagnostics system according to claim 1, wherein the VDM is configured, for each reported strategic fault, to consult a diagnostics database that specifies possible cause faults that may be responsible for the reported strategic fault, and to identify a physical fault from the identified source I/O interface module as being the cause fault for the reported strategic fault in dependence on the physical fault being specified as a possible cause fault for the reported strategic fault in the diagnostics database.

7. The diagnostics system according to claim 1, wherein the I/O interface modules are configured to assess a quality of data contained in the output signals transmitted to the application functions, and to transmit quality factor information to the application functions together with the output signals.

8. The diagnostics system according to claim 7, wherein the application functions are configured to detect strategic faults in dependence on the received quality factor information.

9. The diagnostics system according to claim 1, wherein the VDM is configured to maintain a central fault record of triaged cause and consequence faults.

10. The diagnostics system according to claim 9, wherein the central fault record is maintained in a central fault memory system associated with the VDM, the central fault memory system comprising a primary fault memory and a user-defined secondary fault memory, wherein the VDM is configured to store a record of cause faults in the primary fault memory and to store a record of consequence faults in the user-defined secondary fault memory.

11. An automotive vehicle comprising the diagnostics system according to claim 1.

12. A method of triaging strategic and physical faults detected for a vehicle, the method comprising:
   running physical fault monitors in order to detect physical faults for I/O devices of the vehicle;
   running strategic fault monitors in order to detect strategic faults for functions of the vehicle;
   upon detection of a strategic fault, identifying a signal tag associated with an output signal that caused the detection of the strategic fault;
   identifying a source I/O interface module for the detected strategic fault in dependence on the signal tag associated with the strategic fault;
   reading physical faults from the identified source I/O interface module, and
   triaging the physical faults from the identified source I/O interface module with the reported strategic fault in order to identify a cause fault for the reported strategic fault.

13. The method of claim 12, further comprising, for each reported strategic fault, filtering the physical faults from the identified source I/O interface module by time, by mileage and/or by the I/O the devices or sub-systems to which the physical faults relate in order to select one or more physical faults for triage with the reported strategic fault.

14. The method of claim 12, further comprising, for each reported strategic fault, consulting a diagnostics database that specifies possible cause faults that may be responsible for the reported strategic fault, and identifying a physical fault from the identified source I/O interface module as being the cause fault for the reported strategic fault in dependence on the physical fault being specified as a possible cause fault for the reported strategic fault in the diagnostics database.

15. The method of claim 12, further comprising updating an on-board fault record to include the triaged cause and consequence faults.

\* \* \* \* \*